3,223,671
INSULATED ELECTRICAL CONDUCTORS AND
INSULATION FOR SUCH CONDUCTORS
William M. Kraft, Verona, N.J., assignor, by mesne assignments, to Tenneco Chemicals, Inc., a corporation of Delaware
No Drawing. Filed Oct. 25, 1961, Ser. No. 147,434
6 Claims. (Cl. 260—31.6)

The present invention relates to electrical insulation compositions comprising vinyl chloride resin and pentaerythritol divalerate dipelargonate as a plasticizer for the resin and to electrical conductors insulated with such a composition.

Thermoplastic compositions containing vinyl chloride resin and a plasticizer therefor have been used extensively as insulation for electrical conductors, particularly where low temperatures are encountered. In motors and other locations, high temperatures often exist at which thermoplastic insulation tends to break down. Only a few of the many known plasticizers for vinyl chloride resin can be used in insulation for conductors subjected to elevated temperatures. For example, a number of esters pentaerythritol and fatty acids have been used in vinyl chloride insulation for low temperature applications. However, such esters are not suitable, in general, for high temperature applications. While a few pentaerythritol esters have been recommended plasticizers for 90° C. insulation of vinyl chloride resin none of these esters have been found suitable for 105° C. insulation.

Unexpectedly, it has been discovered that vinyl chloride resin can be plasticized with pentaerythritol divalerate dipelargonate to form thermoplastic insulation for electrical conductors that is resistant to ageing at elevated temperatures of 105° C. After heating at elevated temperatures the insulation is tough and flexible and retains a very high percentage of the original ultimate elongation. For example, a 105° C. insulation should retain 90% of its ultimate elongation after ageing in an oven at 133–137° C. for 4 days. The present thermoplastic insulation meets this requirement.

The vinyl chloride resin employed in the production of the high temperature insulation may be a homopolymer of vinyl chloride or a copolymer of vinyl chloride and a minor amount of another vinyl monomer copolymerizable therewith, for example, vinyl acetate, vinyl propionate, vinyl butyrate, methylmethacrylate, methylacrylate, and the like. By minor amount is meant less than 50%, by weight, of the total weight of monomeric vinyl compounds prior to copolymerization. The preferred solid resins are polyvinyl chloride or a copolymer of vinyl chloride and vinyl acetate in which the vinyl acetate comprises up to 20 percent of the total weight of vinyl chloride and vinyl acetate.

The present specific plasticizer is essentially pentaerythritol divalerate dipelargonate of the formula:

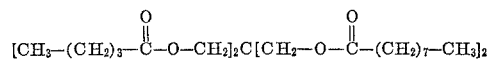

This plasticizer may be prepared in any suitable manner, for example, by esterifying a mole of pentaerythritol with 2 moles of valeric acid and 2 moles of pelargonic acid. The mole ratio referred to indicates the moles which react, not necessarily the mole ratio of reactants in the reaction mixture. One suitable procedure for preparing the present ester involves mixing with each mole of pentaerythritol at least 4 moles of a mixture of valeric acid and pelargonic acid in equal molar proportions and then heating the mixture and effecting esterification of all four of the hydroxyl groups of the pentaerythritol. Preferably, an excess of the mixed acids is used to assure complete esterification of the polyol with the excess acid being removed after the esterification reaction is complete. Alternatively, a mole of pentaerythritol divalerate or pentaerythritol dipelargonate may be esterified with two moles of the other acid to produce pentaerythritol divalerate or dipelargonate. The present invention is not limited to a particular method of esterification.

The amount of pentaerythritol divalerate dipelargonate used in combination with the vinyl chloride resin may be varied over a wide range with, in general, somewhat large amounts being used with the homopolymer of vinyl chloride and somewhat smaller amounts being used with the copolymers. For the preferred vinyl chloride resins, the amount of plasticizer normally will be in the range of 25–75 parts by weight per 100 parts of resin.

Stabilizers, finely divided, inert fillers including pigments, lubricants, antioxidants and other modifiers and additives may be included in the present thermoplastic insulation as is normally done in vinyl chloride insulation materials. The insulation may be applied to the conductor, which may be made of any suitable conductive metal, such as aluminum, copper, an alloy of these metals, etc. For example, extrusion apparatus may be employed in an ordinary manner for coating wire conductors.

In the following examples which are for purposes of illustration, all parts are by weight.

EXAMPLE 1

In the preparation of pentaerythritol divalerate dipelargonate the following materials were charged into a flask equipped with a stirrer, thermometer, a reflux column, and a water trap:

Pentaerythritol _____ 340 g. (2.5 moles).
Valeric acid _____ 561 g. (5.5 moles).
Pelargonic acid _____ 875 g. (5.5 moles).
Phosphoric acid (85%) _____ 17.7 g.
Activated charcoal _____ 35.4 g.

The reaction mixture was gradually heated with stirring to a temperature of 160° C. over a period of 4.5 hours and maintained at this temperature under constant reflux for 18 hours. At the end of this period the acid value of the reaction mixture reached a minimum value. The reaction mixture was cooled to 140° C. and filtered to remove the carbon. The filtrate, after being cooled to room temperature, was washed with 5% aqueous sodium hydroxide solution until basic and then washed with 12% sodium chloride solution until neutral. The neutral product and 15 grams of activated carbon were charged into a flask and heated to 180° C. under a partial vacuum of 2 mm. of mercury pressure to remove a small amount of volatile materials. The hot, stripped material was filtered to remove the carbon. The product, pentaerythritol divalerate dipelargonate, was analyzed and found to contain 0.02% free hydroxyl and to have an acid value of 0.05 and a saponification value of 383.

The pentaerythritol used was monopentaerythritol having a high degree of purity. However, technical grades of pentaerythritol may be used that contain up to 14% of dipentaerythritol.

EXAMPLE 2

A thermoplastic insulation suitable for extrusion molding was prepared by milling the following ingredients on a two-roll mill at 330° F. for about 5 minutes and sheeting off at a thickness of 0.085–0.09 inch.

|  | Parts |
|---|---|
| Polyvinyl chloride | 100 |
| Stabilizers: | |
|     Diabasic lead phthalate | 5 |
|     Dibasic lead stearate | 0.5 |
| Filler | 10 |
| Pentaerythritol divalerate dipelargonate | 50 |
| Total | 165.5 |

In this formulation the vinyl resin was a solid homopolymer of vinyl chloride. The filler was a white, finely divided calcined clay and having the following chemical analysis:

|  | Percent |
|---|---|
| $Al_2O_3$ | 43.75 |
| $SiO_2$ | 54.00 |
| $Fe_2O_3$ | 0.25 |
| $TiO_2$ | 0.75 |
| $K_2O_1Na_2O$ | 1.25 |

The plasticizer was made as described in Example 1.

Two slabs, each 6 x 6 x 0.075 inches, were molded from the sheeted material for electrical testing. The remainder was returned to the mill and reduced to a thickness of 0.05 inch. Slabs were molded by a standard procedure using a 6 x 6 x 0.04 inch mold for measuring physical properties. Physical properties were measured on unaged slabs at 25° C. and on slabs oven aged under two conditions, namely, 96 hours at 133–137° C. and 168 hours at 133–137° C. After ageing the slabs were conditioned at 25° C. for 24 hours before testing. The tensile strength, ultimate elongation and 100% modulus were determined in accordance with ASTM Method D 412–51 T. The brittle point was determined in accordance with ASTM Method D 746–52 T. All values for the physical properties hereinafter set forth are the average of five determinations.

Electrical tests were performed on slabs at 95° C. after being conditioned at 95° C. for one hour. The tests were in accordance with ASTM Method D 257–58. For surface resistivity a potential of 500 volts D.C. was applied for one minute and for volume resistivity a potential of 100 volts D.C. was applied for one minute.

Four batches of insulation were prepared separately as described and in each instance the plasticizer was pentaerythritol divalerate dipelargonate prepared as described in Example 1. However, four separate batches of plasticizer were used. These four batches are referred to as Batches A, B, C and D in the following Tables.

*Table I*

| Batch | Original | | | After Ageing 96 Hrs. at 133–137° C. | | After Ageing 168 Hrs. at 133–137° C. | |
|---|---|---|---|---|---|---|---|
|  | Tensile Strength, p.s.i. | 100% Modulus, p.s.i. | Brittle Point, ° C. | Tensile Strength, p.s.i. | 100% Modulus, p.s.i. | Tensile Strength, p.s.i. | 100% Modulus, p.s.i. |
| A | 3,050 | 2,010 | −27 | 2,860 | 2,360 | 2,930 | 2,670 |
| B | 3,040 | 2,030 | −27 | 3,030 | 2,440 | 2,950 | 2,640 |
| C | 3,100 | 2,030 | −27 | 3,050 | 2,590 | 2,880 | 2,590 |
| D | 3,100 | 2,030 | −29 | 3,060 | 2,520 | 2,890 | 2,480 |

*Table II*

| Batch | Original, Ultimate Elong., Percent | Aged 96 Hrs. at 133–137° C. | | Aged 168 Hrs. at 133–137° C. | |
|---|---|---|---|---|---|
|  |  | Ultimate Elong., Percent | Percent Retention | Ultimate Elong., Percent | Percent Retention |
| A | 336 | 318 | 95 | 276 | 82 |
| B | 355 | 320 | 90 | 292 | 82 |
| C | 346 | 308 | 89 | 282 | 81 |
| D | 338 | 298 | 88 | 292 | 86 |

*Table III*

| Batch | Volume Resistivity ohm-centimeters | Surface Resistivity ohms |
|---|---|---|
| A(1) | 3.14×10⁹ | 20.4×10¹⁴ |
| (2) | 4.84×10⁹ | 30.6×10¹⁴ |
| B(1) | 2.46×10⁹ | 3.67×10¹⁴ |
| (2) | 2.16×10⁹ | 3.57×10¹⁴ |
| C(1) | 2.71×10⁹ | 4.68×10¹⁴ |
| (2) | 2.89×10⁹ | 6.53×10¹⁴ |
| D(1) | 2.89×10⁹ | 6.12×10¹⁴ |
| (2) | 3.01×10⁹ | 7.15×10¹⁴ |

From the foregoing tables it is clear that vinyl chloride resin plasticized with pentaerythritol divalerate dipelargonate forms a strong insulation having highly desirable electrical properties. A very important and unusual property of the present plasticizer is its retention under the severe ageing conditions as shown in Table II. It will be noted that after ageing for 96 hours at 133–137° C., the insulation retained 88–95% of its original ultimate elongation and after ageing for 168 hours at the same temperature, the insulation retained 81–86% of its ultimate elongation. The percent retention was determined by dividing the percent ultimate elongation after ageing by the percent ultimate elongation before ageing and then multiplying this value by 100. Insulation useful at 105° C., commonly referred to as "105° C. insulation," should retain about 90% of its original ultimate elongation after ageing at 133–137° C. for 96 hours to meet generally accepted standards. The present insulation does this.

Various inert fillers including pigments of the type commonly employed in vinyl chloride insulation may be incorporated in the insulation. Such fillers are used in amounts of from 0 to 100% by weight of the vinyl chloride resin with the preferred amount being up to 30% by weight of the resin. Illustrative fillers are carbon black barytes, titanium dioxide, clays, etc. Optimum results are obtained with pentaerythritol divalerate dipelargonate when the composition contains 2½–30% of filler. A small amount of filler aids in retaining the plasticizer, particularly when the present plasticizer is the only plasticizer, and larger amounts tend to reduce the strength of the insulation.

Other plasticizers suitable for high temperature insulation may be used, however, other esters of pentaerythritol completely esterified with moncarboxylic aliphatic acids cannot be used without lowering the quality of the insulation. Accordingly, if other plasticizers are used they should be those which do not increase the aging effect. For example, excellent results have been obtained with the formulation of Example 2 using 25 parts and 12.5 parts of pentaerythritol divalerate dipelargonate with 25 parts and 37.5 parts, respectively, of pentaerythritol adipate butyrate pelargonate produced by esterifying 2 mols of pentaerythritol with 1 mole of adipic acid, 3 moles of butyric acid and 3 moles of pelargonic acid. Esters of dipentaerythritol esterified with fatty acids also may be used as plasticizers in the present insulation.

Optimum results are obtained with pentaerythritol divalerate dipelargonate and other esters of this polyol and these acids are not equivalent. For example, pentaerythritol monovalerate tripelargonate is not sufficiently compatible and pentaerythritol trivalerate monopelargonate is too volatile and the resulting insulation is not 105° C. insulation. It will be noted that in pentaerythritol divalerate dipelargonate the polyol is esterified with equal molar amounts of the two acids and the average number of carbon atoms in the acid radicals is 7. The molar proportions of the two monocarboxylic acids should not be materially changed from the 1:1 ratio. However, the four moles of acid for completely esterifying one mole of pentaerythritol may contain from 1.8 to 2.2 moles of valeric acid and from 2.2 to 1.8 moles of pelargonic acid. The two acids react at the same rate and when used in the foregoing range, the four acid radicals of the pentaerythritol tetraester will contain, on the average, from 6.9 to 7.1 carbon atoms. This very slight variation is included in the term "pentaerythritol divalerate dipelargonate." If the proportion of acids is changed to 2½ moles of valeric acid and 1½ moles pelargonic acid per mole of pentaerythritol the resulting ester contains an average of 6.5 carbon atoms in the acid radicals. However, this last mentioned ester produces an insulation that is not as good upon ageing as when pentaerythritol divalerate dipelargonate is used alone. If the proportion of acids is changed to 2½ moles of pelargonic acid and 1½ moles of valeric acid, the resulting ester does not have the desired degree of compatibility with the vinyl chloride resin.

I claim:

1. An insulated conductor comprising a metallic electrical conductor and thermoplastic insulation for the conductor, the insulation comprising solid vinyl chloride resin and a plasticizer for the resin comprising pentaerythritol divalerate dipelargonate in an amount of from 25% to 75% by weight of said resin.

2. An insulated conductor comprising a metallic electrical conductor and thermoplastic insulation for the conductor, the insulation comprising a solid vinyl chloride resin selected from the group consisting of polyvinyl chloride and copolymers of vinyl chloride and up to 20% by weight of vinyl acetate based on the weight of copolymer, and a plasticizer for the resin comprising pentaerythritol divalerate dipelargonate, said pentaerythritol divalerate dipelargonate comprising from 25 to 75% by weight of said vinyl chloride resin.

3. An insulated conductor for use at elevated temperatures comprising a metallic electrical conductor and thermoplastic insulation for the conductor, the insulation comprising a solid vinyl chloride resin, a plasticizer for the resin consisting of pentaerythritol divalerate dipelargonate in amount of from 25 to 75% by weight of said resin, and an inert filler in amount of from 2½ to 30% by weight of said resin.

4. Thermoplastic electrical insulation comprising solid vinyl chloride resin and a plasticizer for the resin comprising pentaerythritol divalerate dipelargonate in an amount of from 25% to 75% by weight of said resin.

5. Thermoplastic electrical insulation comprising a solid vinyl chloride resin selected from the group consisting of polyvinyl chloride and copolymers of vinyl chloride and up to 20% by weight of vinyl acetate based on the weight of copolymer, and a plasticizer for the resin comprising pentaerythritol divalerate dipelargonate, said pentaerythritol divalerate dipelargonate comprising from 25 to 75% by weight of said vinyl chloride resin.

6. Thermoplastic electrical insulation comprising a solid vinyl chloride resin, a plasticizer for the resin consisting of pentaerythritol divalerate dipelargonate in an amount of from 25 to 75% by weight of said resin, and an inert filler in amount of from 2½ to 30% by weight of said resin.

References Cited by the Examiner
UNITED STATES PATENTS

| | | |
|---|---|---|
| 2,708,173 | 5/1955 | Greenhalgh et al. _ 260—31.6 XR |
| 2,744,877 | 5/1956 | Smith _____ 260—31.6 XR |
| 2,975,152 | 5/1961 | Hurwitz et al. _____ 260—31.6 |

MORRIS LIEBMAN, *Primary Examiner.*

LEON J. BERCOVITZ, *Examiner.*